United States Patent [19]

Eisinger et al.

[11] Patent Number: 5,616,661
[45] Date of Patent: Apr. 1, 1997

[54] PROCESS FOR CONTROLLING PARTICLE GROWTH DURING PRODUCTION OF STICKY POLYMERS

[75] Inventors: Ronald S. Eisinger, Charleston; Christopher S. Hunnisett, Dunbar; Fathi D. Hussein, Crosslanes; Kiu H. Lee, South Charleston, all of W. Va.; Kevin J. Cann, Rocky Hill, N.J.

[73] Assignee: Union Carbide Chemicals & Plastics Technology Corporation, Danbury, Conn.

[21] Appl. No.: 414,522

[22] Filed: Mar. 31, 1995

[51] Int. Cl.$^6$ ........................................ C08F 2/34
[52] U.S. Cl. .................... 526/88; 526/191; 526/194; 526/226; 526/901

[58] Field of Search .................. 526/88, 191, 194, 526/226, 901

[56] References Cited

U.S. PATENT DOCUMENTS

| 4,994,534 | 2/1991 | Rhee et al. .................... 526/88 |
| 5,304,588 | 4/1994 | Boysen et al. .................. 523/204 |
| 5,317,036 | 5/1994 | Brady, III et al. ............... 523/223 |

Primary Examiner—Thomas R. Weber
Attorney, Agent, or Firm—B. L. Deppenbrock

[57] ABSTRACT

A process for controlling the particle growth of a polymer in a gas phase polymerization reaction by using an inert particulate material and an unsupported liquid polymerization catalyst.

10 Claims, 1 Drawing Sheet

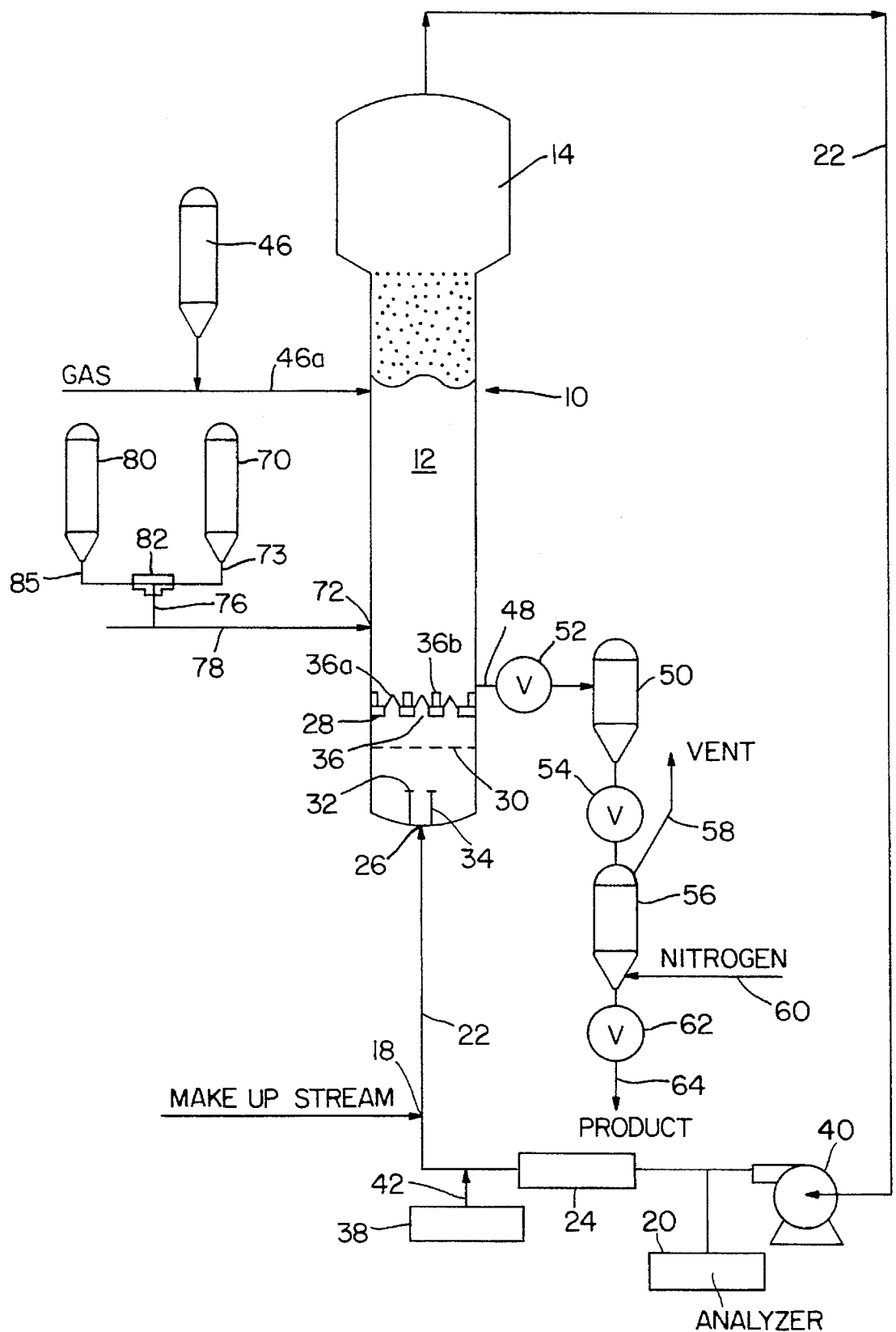

PROCESS FOR CONTROLLING PARTICLE GROWTH DURING PRODUCTION OF STICKY POLYMERS

FIELD OF THE INVENTION

The present invention relates to a process for producing polymers and, more particularly, to a process for controlling particle growth of polymers produced in gas phase polymerization reactions.

BACKGROUND OF THE INVENTION

Gas phase reactions for the production of olefin polymers are well known in the art. Such gas phase reactions are typically carried out in fluidized bed and stirred or paddle-type reaction systems. These reactions can be used to produce polyolefins which are homopolymers, copolymers, and terpolymers of alpha olefins and may optionally contain dienes, aromatic compounds with vinyl unsaturation and/or carbon monoxide.

In these reactions, a catalyst is required to cause polymerization of the one or more alpha olefin monomers having 2 to 12 carbon atoms, and the optional dienes, to take place. Such catalysts can include, but are not limited to, coordinated anionic catalysts, cationic catalysts, free-radical catalysts, anionic catalysts, and the like. In commercial production, such catalysts are generally introduced into the reaction zone as solid particulates in which the catalytically active material is impregnated in an inert support. As used herein, the term "inert" modifying a particular material such as a catalyst support or solvent, means that the material being referred to is non-deactivating in the reaction zone under the conditions of the gas phase polymerization process and is non-deactivating with the catalyst in or out of the reaction zone.

Conventionally, for polymerization of monomers to sticky polymers as in U.S. Pat. No. 4,994,534, particularly ethylene/propylene rubbers (EPRs) which include ethylene/propylene copolymers (EPMs) and ethylene/propylene/diene terpolymers (EPDMs), in the gas phase, the catalyst is impregnated in an inert support so as to facilitate control of polymer particle size which in turn controls the fluidization properties and the bulk density of the polymer product. The polymerization, utilizing an inert particulate material such as carbon black as a fluidization aid to reduce stickiness in the final polymer, is conducted above the softening or sticking temperature of the sticky polymer being formed.

Until recently, those skilled in the art believed that, for polymerization reactions, particularly gas phase polymerization reactions, it is necessary to provide a solid catalyst or a catalyst impregnated in an inert support so as to facilitate control of polymer particle size and thereby control the product polymer morphology and bulk density. U.S. Pat. No. 5,317,036, discloses the use of unsupported, soluble olefin polymerization catalysts having a droplet size ranging from about 1 to about 1,000 microns as useful in gas phase reactions and that they can be introduced into the reaction zone in liquid form. Examples 16–19 of this patent disclose the use of a metallocene catalyst in liquid form with carbon black to produce EPDM in a horizontally mixed batch reactor system.

introduction of a catalyst into the reaction zone in liquid form provides a catalyst activity equal to or even greater than that found with supported catalysts. In a fluid bed polymerization reaction, control of the polymer average particle size is required to maintain a continuous sustained reaction. The average particle size is the average size of the distribution of the particles employed. When the average particle size is too small, the particles are carried over into the cycle piping where fouling of the system occurs. When the polymer particles are allowed to grow too big, then it becomes impossible to fluidize the particles, heat transfer is lost, and the bed agglomerates. There is an on-going need to be able to regulate or control particle growth of the final polymer product.

BRIEF DESCRIPTION OF THE DRAWING

FIG. 1 illustrates a fluidized bed reaction schematic for producing polymers by the process of the present invention.

SUMMARY OF THE INVENTION

Accordingly, the present invention is directed to a process for controlling the particle growth of a polymer in a gas phase polymerization reaction which comprises:

(a) continuously introducing a gaseous stream comprising one or more monomers having from 2 to 18 carbon atoms into a reactor;

(b) introducing an inert particulate material into the reactor so as to maintain an amount in the polymer ranging from about 0.1 to 75 wt % and so as to maintain an average particle size in the polymer in the range of 0.01 to 0.08 inches (250 to 2000 microns) substantially free of oversized polymer particles;

(c) introducing an unsupported polymerization catalyst in liquid form comprising:

(A) (i) a transition metal compound selected from Groups IIIB to VIII of the Periodic Table of Elements and optionally (ii) an organometallic compound, wherein (i) and (ii) are in liquid form; or (B) a solution of (i) a transition metal compound selected from Groups IIIB to VIII of the Periodic Table of Elements or (ii) the reaction product of a transition metal compound selected from Groups IIIB to VIII of the Periodic Table of Elements and (iii) an organometallic compound;

(c) withdrawing a polymeric product from said reaction zone.

DETAILED DESCRIPTION OF THE INVENTION

The process of the present invention can be used to continually produce the polyolefins in a gas phase polymerization reaction conducted in fluidized bed reactors and stirred or paddle-type reaction systems. The process of the present invention is, however, especially advantageous in gas phase fluidized bed reactors to control the average particle size of the final polymer product. The process of the present invention can be carried out in the batch or continuous mode with the continuous mode being preferred.

Polyolefins which are homopolymers, copolymers, and terpolymers of $C_2$ to $C_{18}$ alpha olefins can be produced by the process of this invention. Preferably at least one of the monomers is ethylene. Most preferably, the process of this invention is used to produce sticky polymers which can include ethylene/propylene rubbers and ethylene/propylene/diene termonomer rubbers, polybutadiene rubbers, isoprene rubbers (or 2-methylbutadiene rubber), high ethylene content propylene/ethylene block copolymers, poly(1-butene), low density (low modulus) polyethylenes, i.e., ethylene butene rubbers or hexene containing terpolymers, ethylene/ propylene/ethylidene norbornene and ethylene/propylene/ hexadiene terpolymers of low density. When sticky polymers are produced using the process of the present invention, preferably the polymerization is conducted in the gas phase above the softening or sticking temperature of the sticky polymer.

Monomers

The process of the present invention employs alpha olefins having 2 to 18 carbon atoms. Preferably, the process employs ethylene and at least one alpha olefin having 3 to 18 carbon atoms These alpha olefins can be linear or branched. Illustrative, but non-limiting examples of these alpha olefins, include propylene, butene-1, isobutene, pentene-1, 4-methylpentene-1, hexene-1, octene, decene-1, dodecene-1, tetradecene-1, hexadecene-1, octadecene-1, and mixtures thereof. Preferred alpha olefins for combination with ethylene have 3 to 12 carbon atoms. These alpha olefins are preferably selected from the group consisting of propylene, butene-1, pentene-1, hexene-1, 4-methyl-1-pentene and octene-1. Most preferably the alpha olefins have 3 to 6 carbon atoms and of these propylene, butene-1 and hexene-1 are especially preferred.

Inert Particulate Material

The inert particulate materials employed according to the present invention are materials which are carbon black, silica, clays, talc, inert organic polymeric materials, and other like particulate materials. Carbon black and silica are the preferred materials for the production of EPDMs. The carbon black materials employed have a primary size of about 10 to 100 nanometers and an average size of aggregate (primary structure) of about 0.1 to about 10 microns. The carbon black has a specific surface area of about 30 to 1,500 $m^2$/grams and displays a dibutylphthalate (DBP) absorption of about 80 to about 350 cc/100 grams.

The silicas which can be employed are amorphous silicas having a primary particle size of about 5 to 50 nanometers and an average aggregate of about 0.1 to 10 microns. The average size of the aggregates of silica is about 2 to about 120 microns. The silicas employed have a specific surface area of about 50 to 500 $m^2$/grams and a DBP absorption of about 100 to 400 cc/100 grams.

The clays and talc which can be employed according to the present invention have an average particle size of about 0.01 to about 10 microns and a specific surface area of about 3 to 30 $m^2$/grams. They exhibit oil absorption of about 20 to about 100 grams per 100 grams.

Inert organic polymeric materials which can be used include polymers and copolymers of ethylene, propylene and other alpha olefins. It is preferred to employ these materials in the production of non-diene containing polymers such as ethylene and propylene homopolymers and copolymers with $C_4$–$C_{18}$ carbon atoms. These materials have average particle sizes ranging from about 0.01 to 100 microns, preferably 0.01 to 10 microns.

It is believed that the inert particulate material serves as the main or primary particle formation site for the polymer as it is being formed. The amount of inert particulate material utilized generally depends on the type of material utilized and the type of polymer produced and is designed to produce a polymer with an average particle size in the range of 0.01 to 0.08 inches (250 to 2000 microns) substantially free of oversized polymer particles (e.g., greater than #6 mesh screen size, approximately 3300 microns). When utilizing carbon black or silica as the inert particulate material, they can be employed in amounts of about 0.3 to about 50% by weight preferably about 5% to about, 30% based on the weight of the final product produced. When clays or talcs are employed as the inert particulate material, the amount can range from about 0.3 to about 75% based on the weight of the final product, preferably about 12% to about 75% by weight. When ethylene or propylene polymers or other alpha olefins are used as the inert particulate material, they can be employed in amounts of about 0.1% to about 50% by weight, preferably about 0.1% to about 10% based on the weight of the final polymer product produced. For all densities of polyethylene and polypropylene the amount of inert particulate material required ranges from about 0.1% to 25 wt %, and preferably 1 to 5 wt %. It is understood that the smaller the size of the inert particulate material employed, the greater the amount employed in the process.

The inert particulate materials can be introduced into the reactor, at or near the top of the reactor, at the bottom of the reactor, or to the recycle line directed into the bottom of the reactor. Preferably, the inert particulate material is introduced at or near the top of the reactor or above the fluidized bed. The material can be added separately or combined with one or more monomers, or with the soluble unsupported catalyst. Preferably, the inert particulate material is added separately or with the soluble unsupported catalyst. It is preferred to treat the inert particulate material prior to entry into the reactor to remove traces of moisture and oxygen. This can be accomplished by purging the material with nitrogen gas and heating by conventional procedures or by drying with heated nitrogen (about 150° C.).

Dienes

Sticky polymers produced in the invention can optionally contain one or more non-conjugated dienes. These non-conjugated diene monomers used to produce EPDMs may be straight chain, branched chain or cyclic hydrocarbon dienes having from about 6 to about 15 carbon atoms. Examples of suitable non-conjugated dienes are straight chain acyclic dienes such as 1,4-hexadiene, 1,5-hexadiene, 1,7-octadiene, 1,9-decadiene and 1,6-octadiene. Illustrative branched chain acyclic dienes include such as 5-methyl-1, 4-hexadiene, 3,7-dimethyl-1,6-octadiene, 3,7-dimethyl-1,7-octadiene and mixed isomers of dihydromyricene and dihydrocinene. Single ring alicyclic dienes can include, for example, 1,4-cyclohexadiene, 1,5-cyclooctadiene and 1,5-cyclododecadiene. Illustrative multi-ring alicyclic fused and bridged ring dienes such as tetrahydroindene, methyl tetrahydroindene, dicyclopentadiene, bicyclo(2,2,1)-hepta-2,5-diene; alkenyl, alkylidene, cycloalkenyl and cycloalkylidene norbornenes such as 5-methylene-2-norbornene, 5-propenyl-2-norbornene, 5-iso-propylidene-2-norbornene, 5-(4-cyclopentenyl)-2-norbornene, 5-cyclohexylidene-2-norbornene, 5-vinyl-2-norbornene and 5-ethylidene-2-norbornene can be employed in the process of the present invention. Dienes which are especially preferred include 1,4-hexadiene, and 5-ethylidene-2-norbornene. When employed, the amount of diene in the final resin composition is about 0.01 to about 15 percent by weight based upon the weight of the sticky polymer.

Soluble Unsupported Catalyst

The catalysts employed in process of this invention are composed of a catalyst precursor, co-catalyst, and optionally a promoter. Catalyst precursor compounds that can be used in the polymerization process of the present invention include transition metal compounds from Groups IIB–VIII of the Periodic Table of the Elements that are soluble in hydrocarbon or halocarbon solvents. Among the preferred transition metal compounds are compounds from Groups IVB–VIB. Catalyst precursors are unsupported and can include vanadium compounds, titanium compounds, chromium compounds, and metallocenes. Each transition metal compound is generally employed along with co-catalyst and promoter which are associated with that particular catalyst precursor. Preferred among these precursors are vanadium and titanium precursors. Vanadium compounds are most preferred.

Vanadium compounds which can be used to practice the polymerization process of the present invention are vanadium salts or the reaction product of a vanadium salt and an electron donor. Of course, mixtures of these compounds may also be used. Non-limiting, illustrative examples of these compounds are as follows:

A. vanadyl trihalide, alkoxy halides and alkoxides such as $VOCl_3$, $VOCl_2(OR)$ wherein R is an alkyl having 1 to 12 carbon atoms, and $VO(OC_xH_y)_3$ wherein x is 1 to 12 and y is 2x+1.

B. vanadium tetrahalide and vanadium alkoxy halides such as $VCl_4$ and $VCl_3(OR)$ wherein R is an alkyl having 1 to 12 carbon atoms.

C. vanadium acetylacetonates and chloracetylacetonates such as $V(AcAc)_3$ and $VOCl_2(AcAc)$ wherein (AcAc) is acetylacetonate.

D. vanadium trihalides and alkoxy halides, such as $VCl_3$ and $VCl_2(OR)$ wherein R is an alkyl having 1 to 12 carbon atoms.

The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Examples include ethyl acetate, butyl acetate, ethyl ether, dibutyl ether, methyl acetate and tetrahydrofuran.

Modifiers can also optionally be used with these vanadium catalyst systems. A modifier can have the formula $AlR_{(3a)}Xa$ or $BX_3$ or $SiX_4$ wherein each R is independently an alkyl radical having 1 to 14 carbon atoms; each X is independently chlorine, bromine or iodine; and a is an integer from 0 to 2. Preferred modifiers include alkylaluminum mono and dichlorides, $BCl_3$, and the trialkylaluminums. Examples include diethylaluminum chloride, triethylaluminum and boron trichloride. The molar ratio of modifier to vanadium is in the range of about 1:1 to about 10:1.

Co-catalysts utilized with vanadium compounds consist essentially of an alkyl aluminum halide having the formula $AlR_{(3-a)}X_a$, wherein each R is independently alkyl having 1 to 14 carbon atoms, each X is independently chlorine, bromine or iodine, and a is 1 or 2, or a trialkylaluminum compound having the formula $AlR_3$, wherein R is the same as above. Alkylaluminum halides include alkylaluminum mono- and di-chlorides wherein each alkyl radical has 1 to 14 carbon atoms. Examples include diethylaluminum chloride, ethylaluminum dichloride, ethylaluminum sesquichloride, dimethylaluminum chloride, methylaluminum dichloride, diisobutyl aluminum chloride and isobutylaluminum dichloride. Examples of trialkylaluminum compounds include trihexylaluminum, trimethylaluminum, triethylaluminum, triisobutylaluminum and trioctylaluminum.

The optional promoter utilized with vanadium catalyst precursors can be a chlorinated ester having at least 2 chlorine atoms or a perchlorinated ester. Suitable esters are $Cl_3CCOOC_2H_5$ (ethyl trichloroacetate), $Cl_3CCOOCH_3$ (methyl trichloroacetate), $CCl_3CCl=CClCOOC_4H_9$ (butyl perchlorocrotonate), and $Cl_2C=CClCCl_2COOC_4H_9$ (butyl perchloro-3-butenoate). The promoter can also be a saturated aliphatic hydrocarbon of formula $R_yCX_{(4-y)}$ wherein R is hydrogen or an unsubstituted- or halogen-substituted alkyl radical having 1 to 6 carbons, each X is independently fluorine, chlorine, bromine or iodine and y is an integer from 0 to 2. Examples include methylene dichloride, 1,1,1-trichloroethane, chloroform, $CFCl_3$, hexachloroethane, and $F_2ClCCCl_3$ (1,1-difluorotetrachloroethane). The promoter can also be a saturated aliphatic halocarbon having the formula $C_3X_aF_bH_c$ wherein each X is independently chlorine, bromine or iodine, a is an integer from 6 to 8, b and c are integers from 0 to 2, and a+b+c equals 8. Examples include hexachloropropane, heptachloropropane and octachloropropane. These saturated halocarbon promoters are mentioned in U.S. Pat. No. 4,892,853. In addition, the promoter can also be an unsaturated aliphatic halocarbon such as perchloropropylene or any unsaturated halocarbon having a $CX_3$ group attached to a C=C group wherein each X is independently chlorine, bromine or iodine or a haloalkyl substituted aromatic hydrocarbon wherein the haloalkyl substituent has at least 3 halogen atoms, such as trichlorotoluene or trichloroxylene.

The preferred vanadium compounds are $V(AcAc)_3$, $VCl_3$, $VOCl_3$, $VCl_4$, and $VO(OR)_3$ wherein R is a hydrocarbon radical, preferably a $C_1$ to $C_{12}$ aliphatic or aromatic hydrocarbon radical such as ethyl, phenyl, isopropyl, butyl, propyl, n-butyl, i-butyl, t-butyl, hexyl, cyclohexyl, naphthyl, and so forth and electron donor complexes of these vanadium compounds. Such catalysts are described, for example, in U.S. Pat. Nos. 4,508,842; 5,342,907 and 5,332,793. Of these vanadium compounds, $VO(OR)_3$, $VOCl_3$, and V(acetylacetonate)$_3$ are most preferred.

Suitable titanium compounds for use in the present invention include catalyst precursors having the formula $Mg_a$-$Ti(OR)_bX_c(ED)_d$ wherein R is independently an aliphatic or aromatic hydrocarbon radical having 1 to 14 carbon atoms or COR' wherein R' is an aliphatic or aromatic hydrocarbon radical having 1 to 14 carbon atoms; X is independently chlorine, bromine or iodine; ED is an electon donor; a is 0.5 to 56; b is an integer from 0 to 2; c is 2 to 116; and d is 2 to 85. Titanium compounds which are useful in preparing these precursors have the formula $Ti(OR)_bX_e$ wherein R, X and b are as defined above, e is an integer from 1 to 4, and b+e is 3 or 4. Examples include $TiCl_3$, $TiCl_4$, $Ti(OC_2H_5)_2Br_2$, $Ti(OC_6H_5)Cl_3$ and $Ti(OCOCH_3)Cl_3$. These titanium-based catalysts and their method of preparation are disclosed more fully in U.S. Pat. No. 4,302,565.

Electron donors, modifiers, co-catalysts and promoters can be used with titanium-based catalysts in the same manner as for vanadium, and are the same as those described above for vanadium. The particular combination of electron donor, modifier, co-catalyst, and promoter are chosen from those known to those skilled in the art of polymerization to be most efficacious for the particular catalyst precursor.

Chromium compounds which are suitable for use in the present invention include chromyl chloride ($CrO_2Cl_2$), chromium 2-ethylhexanoate, chromium acetylacetonate (Cr(AcAc)$_3$), and the like which are disclosed in, for example, U.S. Pat. Nos. 3,242,099 and 3,231,550.

Metallocenes which can be employed in the invention include catalyst compositions comprising at least one metallocene catalyst and at least one co-catalyst. One useful class of metallocene catalysts are organometallic compounds containing at least one cyclopentadienyl group bonded to a Group IIIB to VIII metal, such as mono, di-, and tricyclopentadienyls and their derivatives of these transition metals.

A preferred metallocene catalyst containing at least one cyclopentadienyl group bonded to a Group IIIB to VIII metal has the formula:

$$(C_5R_n)_yR'_z(C_5R_m)MY_{(x-y-1)} \quad (1)$$

wherein M is a metal from Groups IIIB to VIII of the Periodic Table; ($C_5R_n$) and ($C_5R_m$) are independently cyclopentadienyl or substituted cyclopentadienyl groups bonded to M; each R is independently hydrogen or a hydrocarbyl radical such as alkyl, alkenyl, aryl, alkylaryl, or arylalkyl radical containing from 1 to 20 carbon atoms, or two carbon atoms are joined together to form a $C_4$–$C_6$ ring; each R' is a $C_1$–$C_4$ substituted or unsubstituted alkylene radical, a dialkyl or diaryl germanium or silicon, or an alkyl or aryl phosphine or amine radical bridging two ($C_5R_n$) and ($C_5R_m$) rings; each Y is independently a hydrocarbyl radical such as aryl, alkyl, alkenyl, alkylaryl, or arylalkyl radical having from 1–20 carbon atoms, hydrocarboxy radical having from 1 to 20 carbon atoms, or halogen; n and m are each 0, 1, 2, 3, or 4; z is 0 or 1, and z is 0 when X is 0; X is 0, 1, or 2; x is 1, 2, 3, or 4 depending upon the valence state of M; and x-y≧1.

Illustrative, but non-limiting examples, of metallocene catalysts of Formula 1 are dialkyl metallocenes such as bis(cyclopentadienyl)titanium dimethyl, bis(cyclopentadienyl)zirconium dimethyl; the mono alkyl metallocenes such as bis(cyclopentadienyl)zirconium methyl chloride; the trialkyl metallocenes such as cyclopentadienyl titanium trimethyl; silicon, phosphine, amine or carbon bridged metallocene compounds such as isopropylidene(cyclopentadienyl)(fluorenyl)zirconium dichloride, diphenylmethylene(cyclopentadienyl)(fluorenyl)zirconium dichloride, rac-ethylenebis(indenyl)zirconium dichloride.

A more preferred metallocene catalyst containing at least one cyclopentadienyl group bonded to a Group IIIB to VIII metal is a bridged metallocene having the formula:

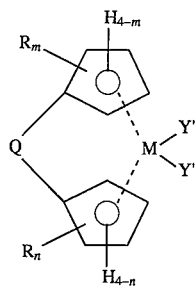

(2)

wherein:

Q is a bridging linkage selected from

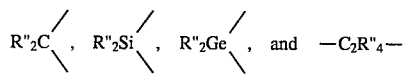

wherein each R" moiety is independently H or an alkyl group, or two R" moieties are joined to form a ring structure. Preferably, when an R" moiety is an alkyl group, it contains 3 to 8 carbon atoms, and when two R" moieties are joined to form a ring structure with the atom or atoms to which they are respectively attached, a 5 or 6-membered ring is formed. The subscripts m and n are each 0, 1, 2, 3, or 4, and the sum of m and n is preferably 2 to 6. The metal M is a Ti, Zr, or Hf atom, preferably Zr. Each Y' is independently H, an alkyl group, or a halogen atom.

In bridged metallocenes, the cyclic π-bonded moieties may bear one or more substituents R. Each R moiety is independently an alkyl, cycloalkyl, alkenyl, cycloalkenyl, phenyl, alkyl-substituted phenyl, or a phenyl-substituted alkyl group, or two adjacent R groups on a given ring are joined to form a second ring. Preferably, each R moiety is independently an alkyl or cycloalkyl group of 3 to 8 carbon atoms, an alkenyl group of 2 to 8 carbon atoms, a cycloalkenyl group of 5 to 8 carbon atoms, phenyl, an alkyl-substituted phenyl group in which the alkyl group contains 3 to 8 carbon atoms, a phenyl-substituted alkyl group in which the alkyl portion contains 1 to 4 carbon atoms, or two adjacent R groups on a given ring are joined and together with the carbon atoms to which they are respectively attached form a saturated or unsaturated 4, 5, or 6-membered ring.

Illustrative but non-limiting examples of bridged metallocenes of Formula (2) that may be used as the metallocene catalyst are rac-ethylenebis(indenyl)zirconium dichloride and racethyl ethylenebis(4,5,6,7-H-tetrahydroindenyl )zirconium dichloride.

Another class of useful metallocene catalysts are constrained geometry metallocenes as described in PCT Publication No. WO 93/08221.

Preferred constrained geometry metallocenes have the formula:

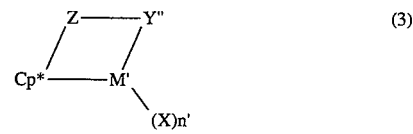

(3)

wherein M' is a metal of Groups IIIB–VIII or the Lanthanide series of the Periodic Table; Cp* is a cyclopentadienyl or substituted cyclopentadienyl group bound in an $h^5$ bonding mode to M'; Z is a moiety comprising boron or a member of Group IVa of the Periodic Table, and optionally sulfur or oxygen, said moiety having up to 20 non-hydrogen atoms, and optionally Cp* and Z together form a fused ring system; each X is independently an anionic ligand group or neutral Lewis base ligand group having up to 30 non-hydrogen atoms; n' is 1, 2, 3, or 4 and is 2 less than the valence of M'; and Y" is an anionic or nonionic ligand group bonded to Z and M' comprising nitrogen, phosphorus, oxygen, or sulfur and having up to 20 non-hydrogen atoms, optionally Y" and Z together form a fused ring system.

Illustrative, but non-limiting examples, of preferred constrained geometry metallocenes include (tert-butylamido)(tetramethyl-$h^5$-cyclopentadienyl)-1,2-ethanediylzirconium dichloride and (methylamido)(tetramethyl-$h^5$-cyclopentadienyl)-1,2-ethanediyltitanium dichloride.

The co-catalyst is capable of activating the metallocene catalyst, and may be one of the following: (a) branched or cyclic oligomeric poly(hydrocarbylaluminum oxide)s which contain repeating units of the general formula —(Al(R''')O)—, where R''' is hydrogen, an alkyl radical containing from 1 to about 12 carbon atoms, or an aryl radical such as a substituted or unsubstituted phenyl or naphthyl group; (b) ionic salts of the general formula $[A^+][BR*_4^-]$, where A+ is a cationic Lewis or Bronsted acid capable of abstracting an alkyl, halogen, or hydrogen from the bridged metallocene catalyst, B is boron, and R* is a substituted aromatic hydrocarbon, preferably a perfluorophenyl radical; and (c) boron alkyls of the general formula $BR*_3$, where R* is as defined above.

Preferably, the co-catalyst employed with the metallocene catalyst is a branched or cyclic oligomeric poly(hydrocarbylaluminum oxide). More preferably, the co-catalyst is an aluminoxane such as methylaluminoxane (MAO) or modified methylaluminoxane (MMAO).

Aluminoxanes are well known in the art and comprise oligomeric linear alkyl aluminoxanes represented by the formula:

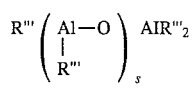

and oligomeric cyclic alkyl aluminoxanes of the formula:

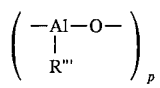

wherein s is 1 to 40, preferably 10 to 20; p is 3 to 40, preferably 3 to 20; and R''' is an alkyl group containing 1 to 12 carbon atoms, preferably methyl or an aryl radical such as a substituted or unsubstituted phenyl or naphthyl radical.

The metallocene catalyst composition may optionally contain one or more second catalysts. These second catalysts include, for example, any Ziegler-Natta catalysts containing a metal from Groups IV(B), V(B), or VI(B) of the Periodic Table. Suitable activators for Ziegler-Natta catalysts are well known in the art and may also be included in the catalyst composition.

The solvents that are desirably utilized to form solutions of the soluble transition metal polymerization catalyst compounds are inert solvents, preferably non-functional hydrocarbon solvents and may include aliphatic hydrocarbons such as butane, isobutane, ethane, propane, pentane, isopentane, hexane, octane, decane, dodecane, hexadecane, octadecane, and the like; alicyclic hydrocarbons such as cyclopentane, methylcyclopentane, cyclohexane, cyclooctane, norbornane, ethylcyclohexane and the like; aromatic hydrocarbons such as benzene, toluene, ethylbenzene, propylbenzene, butylbenzene, xylene, and the like; and petroleum fractions such as gasoline, kerosene, light oils, and the like. Likewise, halogenated hydrocarbons such as methylene chloride, carbon tetrachloride, chlorobenzene, chloroform and the like, may also be utilized. By non-functional is meant that the solvents do not contain groups such as strong polar groups which can deactivate the active transition metal sites.

The concentration of catalyst or co-catalyst that is provided in solution as it is being introduced into the reaction zone may be as high as the saturation point of the particular solvent being used. Of course, if the catalyst is being used in its neat form, i.e., in its liquid state with no solvent, it will be comprised of essentially pure or neat catalyst. The liquid catalyst is fed to the reactor in a more or less continuous stream using an injection tube or pipe.

The amount of inert particulate material utilized generally depends on the type of material utilized and the type of polymer produced. For EPR's utilizing carbon black or silica as the inert particulate material, they can be employed in amounts of about 0.3 to about 50% by weight preferably about 5% to about 30% based on the weight of the final product produced. When clays or talcs are employed as the inert particulate material, the amount can range from about 0.3 to about 80% based on the weight of the final product preferably about 12 to about 75% by weight. For the production of polypropylene, polyethylene, and occasionally for EPRs, ethylene or propylene polymers are used as the inert material, they can be employed in amounts of about 0.1 to about 50% by weight preferably about 0.1% to about 10% based on the weight of the final product produced. For all densities of polyethylene and polypropylene the amount of inert particulate material required is 0.4% to 25 wt % and preferably 1% to 5 wt %.

Chain Transfer Agents

A chain transfer agent, such as hydrogen or a metal alkyl (e.g., diethyl zinc) are normally used in polymerizations to control molecular weight. They can be employed during the polymerization process of this invention. Such transfer agents are well known in the art and are used in the normal manner in the polymerization of the resin product herein. When a chain transfer agent is used in a polymerization process, it is preferably added after polymerization is initiated and gradually increased in concentration to produce the desired polymer product.

Other Additives

Other conventional additives may be introduced into the reaction zone as part of the catalyst solution provided that they do not interfere with the feeding of the catalyst solution. In order for such additives to be added to the reaction zone as part of the catalyst solution, they must be liquids or capable of being dissolved in the catalyst solution. If the additives are solids, they can be introduced into the reaction zone independently of the catalyst solution. Such additives may include scavenging agents and the like.

Polymerization Process

The fluidized bed reactor can be the one described in U.S. Pat. No. 4,558,790 except that the heat exchanger may be located after the compressor and the inert particulate material is preferably fed above the fluidized bed surface or as described in U.S. Pat. Nos. 4,994,534 and 5,304,588. Other types of conventional reactors for the gas phase production of, for example, polyethylene or ethylene copolymers and terpolymers can also be employed. At the start up, the bed is usually made up of granular polymer resin. During the course of the polymerization, the bed comprises formed polymer particles and growing polymer particles fluidized by polymerizable and modifying gaseous components introduced at a flow rate or velocity sufficient to cause the particles to separate and act as a fluid. The fluidizing gas is made up of the initial feed, make-up feed, and cycle (recycle) gas, i.e., monomer and, if desired, modifiers and/or an inert carrier gas. A typical cycle gas can comprise ethylene, nitrogen, hydrogen, propylene, butene, or hexene monomers, diene monomers, either alone or in combination.

Under conventional procedures, the inert particulate materials are normally introduced into the reactor either at the bottom of the reactor or to the recycle line directed into the bottom of the reactor. According to the present invention, however, the inert particulate materials are preferably introduced to the reactor at a point above the fluidized bed. It is preferred to treat the inert particulate material prior to entry into the reactor to remove traces of moisture and oxygen. This can be accomplished by purging the material with hot nitrogen gas and heating by conventional procedures or by treating with metal alkyls.

A fluidized bed reaction system which is particularly suited to production of sticky polymers by the practice of the process of the present invention is illustrated in the drawing. With reference thereto and particularly to FIG. 1, the reactor 10 comprises a reaction zone 12 and a velocity reduction zone 14.

In general, the height to diameter ratio of the reaction zone can vary in the range of about 2.7:1 to about 5:1. The range, of course, can vary to larger or smaller ratios, and depends upon the desired production capacity. The cross-sectional area of the velocity reduction zone 14 is typically within the range of about 2.5 to about 2.9 multiplied by the cross-sectional area of the reaction zone 12.

The reaction zone 12 includes a bed of growing polymer particles, formed polymer particles and optionally a diene all fluidized by the continuous flow of polymerizable and modifying gaseous components in the form of make-up feed and recycle fluid through the reaction zone. To maintain a viable fluidized bed, the superficial gas velocity (SGV) through the bed must exceed the minimum flow required for fluidization which is typically from about 0.2 to about 0.8 ft/sec. depending on the average particle size of the product. Preferably the SGV is at least 1.0 ft/sec. above the minimum flow for fluidization or from about 1.2 to about 6.0 ft/sec.

Ordinarily, the SGV will not exceed 6.0 ft/sec. and it is usually no more than 5.5 ft/sec.

Particles in the bed help to prevent the formation of localized "hot spots" and to entrap and distribute the catalyst through the reaction zone. Accordingly, on start up, the reactor is charged with a seed bed of particulate polymer particles before gas flow is initiated. Such particles may be the same as the polymer to be formed or different. When different, they are withdrawn with the desired newly formed polymer particles as the first product. Eventually, a fluidized bed consisting of desired polymer particles supplants the start-up bed. Preferably such particles are the same as the polymer to be formed. Usually these particles are obtained from an earlier production run.

The catalysts used are often sensitive to oxygen, thus the catalyst used to produce polymer in the fluidized bed is preferably stored under a blanket of a gas which is inert to the stored material, such as nitrogen or argon.

If the catalyst requires the use of one or more co-catalysts, as is usually the case, the one or more co-catalysts may be introduced separately into the reaction zone where they will react with the catalyst to form the catalytically active reaction product. However, the catalyst and co-catalyst(s) may be premixed prior to their introduction into the reaction zone.

For example, in the catalyst system comprising metallocene as the catalyst and aluminoxane as the co-catalyst, it is the reaction product of the metallocene and the aluminoxane which forms the catalytically active material needed for polymerization of the olefins. The metallocene(s) and the aluminoxane(s) may be mixed with one another and the reacted mixture, which is still in liquid form, is introduced into the reaction zone. Alternatively, the metallocene(s) which are in liquid form and the aluminoxane(s) which are also in liquid form may be independently added to the reaction zone. It is in the reaction zone where the metallocene(s) and the aluminoxane(s) react to form the catalytically active material. As a still further embodiment, although not preferred, it is also within the scope of the present invention to react the catalyst with the co-catalyst, such as the metallocene(s) with the aluminoxane(s), and isolate a solid reaction product thereof. This catalytically active solid reaction product is then dissolved in a suitable solvent when desired and introduced into the reaction zone as a solution. It is to be understood that all of the various embodiments discussed above for introducing the polymerization catalyst into the reaction zone are broadly applicable to the more general transition metal olefin polymerization catalyst and organometallic co-catalyst as well.

In the present invention, the catalyst and co-catalyst may or may not be mixed prior to their introduction into the reaction zone. A soluble transition metal catalyst from tank 80 is fed through line 85 to a mixing tee 82 where it is mixed with one or more co-catalysts from tank 70 which is fed to mixing tee 82 through line 73. The catalyst and co-catalyst(s) are provided in liquid form. Once the mixture is in line 76, the catalyst/co-catalysts mixture react with one another to form the desired catalytic reaction product in situ. Generally, the length of line 76 is such that it provides ample residence time for the catalyst/cocatalyst(s) to react with one another and form the desired reaction product which remains in solution. In this manner, once the catalyst reaches line 78 and enters the reactor at point 72, substantially all of the catalyst/co-catalyst(s) will have reacted and catalytically reactive reaction product, which will have formed in situ, will desirably be introduced into the reaction zone in liquid form. Preferably, the catalyst is injected at a point in the bed where good mixing with polymer particles occurs. Injecting the catalyst at a point above the distributor plate provides satisfactory operation of a fluidized bed polymerization reactor. Since catalysts are highly active, injection of the catalyst into the area below the distributor plate may cause polymerization to begin there and eventually cause plugging of the distributor plate. Injection into the fluidized bed aids in distributing the catalyst throughout the bed and tends to preclude the formation of localized spots of high catalyst concentration which may result in the formation of "hot spots".

Fluidization is achieved by a high rate of fluid recycle to and through the bed, typically on the order of about 50 to about 150 times the rate of feed of make-up fluid. This high rate of recycle provides the requisite superficial gas velocity necessary to maintain the fluidized bed. The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor.

Make-up fluid can be fed at point 18 to recycle line 22 although it is also possible to introduce make up fluid between heat exchanger 24 and velocity reduction zone 14 in recycle line 22. The composition of the recycle stream is measured by a gas analyzer 20 and the composition and amount of the make-up stream is then adjusted accordingly to maintain an essentially steady state gaseous composition within the reaction zone.

The gas analyzer is a conventional gas analyzer which operates in conventional manner to indicate recycle stream composition which is then used to regulate the feed. The gas analyzer 20 can be positioned to receive gas from a point between the velocity reduction zone 14 and the dispenser 38, preferably after the compressor 40.

To ensure complete fluidization, the recycle stream and make-up stream are returned through recycle line 22 to the reactor at reactor base 26 below the bed. Preferably there is a gas distributor plate 28 above the point of return to aid in fluidizing the bed uniformly and to support the solid particles prior to start-up or when the system is shut down. The stream passing upwardly through the bed absorbs the heat of reaction generated by the polymerization reaction.

The portion of the gaseous stream flowing through the fluidized bed which did not react in the bed becomes the recycle stream which leaves the reaction zone 12 and passes into a velocity reduction zone 14 above the bed where a major portion of the entrained particles drop back into the bed thereby reducing solid particle carryover.

The recycle stream exiting the compressor is then returned to the reactor at its base 26 and thence to the fluidized bed through gas distributor plate 28. A fluid flow deflector 32 is preferably installed at the inlet to the reactor to prevent contained polymer particles from settling out and agglomerating into a solid mass and to maintain entrained or to re-entrain any liquid or solid particles which may settle out or become disentrained.

The fluid flow deflector comprises an annular disc supported at a stand off distance above the base 26 by the spacers 34 and divides the entering recycle stream into a central upward flow stream and an upward peripheral annular flow stream along the lower side walls of the reactor. The flow streams mix and then pass through protective screen 30, the holes or ports 36 of the distributor plate 28 and the angle caps 36a and 36b, secured to the upper surface of the distributor plate, and eventually into the fluidized bed.

The temperature of the bed is basically dependent on three factors: (1) the rate of catalyst injection which controls the rate of polymerization and the attendant rate of heat generation; (2) the temperature of the gas recycle stream; and (3) the volume of the recycle stream passing through the fluidized bed. Of course, the amount of liquid introduced into the bed either with the recycle stream and/or by separate introduction also affects the temperature since this liquid vaporizes in the bed and serves to reduce the temperature. Normally the rate of catalyst injection is used to control the rate of polymer production. The temperature of the bed is controlled at an essentially constant temperature under steady state conditions by constantly removing the heat of reaction. By "steady state" is meant a state of operation where there is essentially no change in the system with time. Thus, the amount of heat generated in the process is balanced by the amount of heat being removed and the total quantity of material entering the system is balanced by the amount of material being removed. As a result, the temperature, pressure, and composition at any given point in the system is not changing with time. No noticeable temperature gradient appears to exist within the upper portion of the bed. A temperature gradient will exist in the bottom of the bed in a layer or region extending above the distributor plate, e.g., for about 6 to about 12 inches, as a result of the difference between the temperature of the inlet fluid and temperature of the remainder of the bed. However, in the upper portion or region above this bottom layer, the temperature of the bed is essentially constant at the maximum desired temperature.

Good gas distribution plays an important role in the efficient operation of the reactor. The fluidized bed contains growing and formed particulate polymer particles, as well as catalyst. As the polymer particles are hot and possibly active, they must be prevented from settling, for if a quiescent mass is allowed to exist, any active catalyst present will continue to react and can cause fusion of the polymer particles resulting, in an extreme case, in the formation of a solid mass in the reactor which can only be removed with a great difficulty and at the expense of an extended downtime. Since the fluidized bed in a typical commercial size reactor may contain many thousand pounds of solids at any given time, the removal of a solid mass of this size would require a substantial effort. Diffusing recycle fluid through the bed at a rate sufficient to maintain fluidization throughout the bed is, therefore, essential.

Any fluid inert to the catalyst and reactants and which, if a liquid, will volatilize under the conditions present in the fluidized bed, can also be present in the recycle stream. Other materials, such as catalyst activator (co-catalyst and/or promoter) compounds, if utilized are preferably added to the reaction system downstream from compressor 40. Thus the materials may be fed into the recycle system from dispenser 38 through line 42 as shown in FIG. 1.

The fluid bed reactor may be operated at pressures of up to about 1000 psig. The reactor is preferably operated at a pressure of from about 250 to about 500 psig, with operation at the higher pressures in such ranges favoring heat transfer since an increase in pressure increases the unit volume heat capacity of the gas.

Under conventional procedures, the inert particulate materials are normally introduced into the reactor either at the bottom of the reactor or to the recycle line directed into the bottom of the reactor. According to the present invention, however, the inert particulate materials are preferably introduced to the reactor at a point near the top or above the fluidized bed. It is preferred to treat the inert particulate material prior to entry into the reactor to remove traces of moisture and oxygen. This can be accomplished by purging the material with nitrogen gas, and heating by conventional procedures. The inert particulate materials are continuously introduced into the reactor from vessel 46 through line 46a. The amount of inert particulate material utilized generally depends on the type of material utilized and the type of polymer produced. When utilizing carbon black or silica as the inert material, they can be employed in amounts of about 0.3 to about 50% by weight preferably about 5% to about 30% based on the weight of the final product produced. When clays or talcs are employed as the inert particulate material, the amount can range from about 0.3 to about 80% based on the weight of the final product, preferably about 12 to about 75% by weight. When ethylene or propylene polymer are used as the inert material, they can be employed in amounts of about 0.1 to about 50% by weight, preferably about 0.1% to about 10% based on the weight of the final product produced. For all densities of polyethylene and polypropylene, the amount of inert particulate material required is less than 25 wt % and preferably less than 5 wt %. In practice this is accomplished by conveyance of the inert particulate material under high pressures of nitrogen.

A gas which is inert to the catalyst, such as nitrogen or argon, is preferably used to carry the catalyst into the bed via an injection tube. The selection of a particular injection spray tube for use with the catalyst in liquid form is well within the knowledge of those skilled in the art. The temperature of the catalyst in liquid form as it is introduced into the reaction zone is not critical. Typically, the temperature of the catalyst may simply be at ambient temperature.

The catalyst can be introduced intermittently or continuously into the reaction zone at a desired rate above distributor plate. Intermittent catalyst feeding may be used to help keep the catalyst solution flow rate in the proper range. It is desirable to maintain a continuous flow of the inert carrier through the tube, be it a liquid or gas, at a rate sufficient to prevent fouling of the injection tube. Conventional metering valves or pumps can be used to deliver a precise flow of the catalyst to the reaction zone. Controlled intermittent catalyst flow may be delivered to the reaction zone using conventional syringe or positive displacement pumps.

The rate of polymer production in the bed depends on the rate of catalyst injection and the concentration of monomer(s) in the recycle stream. The production rate is conveniently controlled by simply adjusting the rate of catalyst injection.

Under a given set of operating conditions, the fluidized bed is maintained at essentially a constant height by withdrawing a portion of the bed as product at the rate of formation of the particular polymer product. Complete instrumentation of both the fluidized bed and the recycle stream cooling system is, of course, useful to detect any temperature change in the bed so as to enable either the operator or a conventional automatic control system to make a suitable adjustment in the temperature of the recycle stream or adjust the rate of catalyst injection.

On discharge of particulate polymer product from the reactor 10, it is desirable, and preferable, to separate unreacted monomers and dissolved liquid from the product. There are numerous ways known to the art to accomplish this. One system is shown in the drawing. Thus, product leaves the reactor 10 at point 48 and enters the product discharge tank 50 through a valve 52 which is designed to have minimum restriction to flow when opened, e.g., a ball valve. Positioned below product discharge tank 50 is a conventional valve 54 with the latter being adapted to provide passage of product into the product surge tank 56. The product surge tank 56 has venting means illustrated by line 58 and gas entry means illustrated by line 60. Also positioned at the base of product surge tank 56 is a discharge valve 62 which, when in the open position, discharges product for conveying to storage through line 64.

The following Examples will illustrate the present invention.

EXAMPLES

Examples 1 and 2

Illustrate controlled particle morphology and long term operability during continuous operation.

A fluidized bed reactor of the type described in FIG. 1 was used. An unsupported catalyst of 10 wt. % solution of vanadium trisacetylacetonate, V(AcAc)$_3$, in toluene was fed with a nitrogen carrier gas into a fluidized bed of EPDM. The diene used was 5-ethylidene-2-norbornene (ENB). The catalyst feed was controlled at a rate which produced the desired space time yield of 4–5 lb/hr/ft3. The cocatalyst was an aluminum alkyl, diethyl aluminum chloride. The promoter was ethyl trichloroacetate. The cocatalyst and promoter were each fed separately to the reactor. The promoter-to-cocatalyst molar ratio was about 0.17. Carbon black (Cabot Black Pearls 170 supplied by Cabot Industries) was used as the inert particulate material for stable operation with an unsupported catalyst as well as fluidization aid for producing polymer above its softening point. The addition of carbon black was controlled at a level such that it produced a polymer particle having the desired stable particle size (one which did not grow above the desired average particle size range (0.01 and 0.08 inches or 250 to 2000 microns) with time. Before the carbon black was introduced into the reactor, it was heated, and purged with nitrogen to remove absorbed water and oxygen which are poisons for the reaction. The complete reaction conditions are summarized in Table 1.

The reactor was run continuously with the unsupported catalyst for 3 days, at which time the unsupported catalyst supply was exhausted. Particle size, reactor operation, and polymer properties remained stable with continuous operation. The reaction conditions and product properties are summarized under Example 1 of Table 1.

Example 2 is similar to Example 1, except that the reactor ran for 46 hours before the unsupported catalyst supply was exhausted. Particle size, reactor operation, and polymer properties remained stable with continuous operation.

TABLE 1

STEADY STATE CONDITIONS WITH UNSUPPORTED (SOLUTION) CATALYST

|  | Example 1 | Example 2 |
|---|---|---|
| CATALYST | | |
| Type | Vanadium Tris-Acetylacetonate | Vanadium Tris-Acetylacetonate |
| Concentration, wt. % | 10% in Toluene | 10% in Toluene |
| REACTION CONDITIONS | | |
| Temperature, °C. | 35 | 35 |
| Pressure, psia | 395 | 395 |
| Hydrogen/Ethylene volume ratio | 1.4 | 1.4 |
| ENB, gas phase ppm by volume | 13.5 | 8.8 |
| ENB, wt.% in bed | 3.2 | 2.5 |
| Ethylene Partial Pressure, psia | 90 | 90 |
| Inert Particulate Material (Carbon Black) | Cabot Black Pearls 170 | Cabot Black Pearls 170 |
| PHYSICAL CONDITIONS | | |
| Superficial Gas Velocity, ft/sec | 1.75 | 1.70 |
| Space Time Yield, lb/hr/ft 3 | 4.6 | 4.2 |
| Residence Time, hr | 2.0 | 2.3 |
| PARTICLE SIZE | | |
| Weight Average Particle Size, inches | 0.060 | 0.064 |
| RESIN PROPERTIES | | |
| Inert Particulate Material, wt. % | 21.2 | 22.0 |

TABLE 1-continued

STEADY STATE CONDITIONS WITH UNSUPPORTED (SOLUTION) CATALYST

|  | Example 1 | Example 2 |
|---|---|---|
| CATALYST | | |
| Mooney Viscosity, ML(1 + 4), 125° C. | 60.6 | 66.5 |
| Propylene, Polymer wt. % by IR | 24.5 | 24.6 |
| ENB, Polymer wt. % by IR | 4.4 | 2.3 |
| Vanadium, ppm by weight | 48 | 37 |

Comparative Example 3

Solution catalyst—Low level of Carbon:

The reactor (A fluidized bed reactor of the type described in FIG. 1 was used) was started up under conditions that produced an ethylene-propylene-diene terpolymer using supported vanadium (acetylacetonate)3 catalyst. The V(AcAc)$_3$ was supported on a silica (Type 958 supplied by W. R. Grace, Davison Silica Division and dehydrated at about 600° C.). As co-catalyst diethylaluminum chloride (DEAC) was fed to the reactor, and ethyltrichloroacetate (ETCA) was fed as the promoter. The reaction was stabilized at 35° C. at C$_2$/C$_3$ molar ratio of 1.4, and an H$_2$/C$_2$ ratio of 0.095 to produce an EPDM with 24% C$_3$, 4% ENB, and 60 Mooney viscosity. Carbon black (Cabot Black Pearls 170 supplied by Cabot Industries) in the range of 14% (based on resin production) was fed continuously to the reactor as fluidization aid to prevent resin stickiness and particle agglomeration. The average polymer particle size was stable at about 0.03 inches.

With all conditions the same including the level of carbon black, a switch was then made to feeding unsupported V(AcAc)$_3$ catalyst (10 wt % in toluene). This catalyst was fed with a nitrogen carrier gas into the fluidized bed reactor. The polymer average particle size was observed to increase from about 0.03 inches to 0.07 inches. A substantial increase in particle agglomeration was also observed. The agglomeration level as measured by the percent of particles over 6 mesh screen was increased from 0% to about 18 percent 15 hours after transition to the unsupported catalyst. The fluidization quality was also observed to deteriorate as indicated by a decrease in the fluidized bulk density from 19 lbs/cf to 14 lbs/cf. This example shows that without average particle size controls, unacceptable particle growth occurs in continuous mode, gas phase operation.

Example 4

The reactor was operated under similar conditions as in Comparative Example 3 using unsupported V(AcAc)$_3$ catalyst in toluene to produce EPDM product with carbon black as fluidization aid. The carbon level was increased from 14% to about 22%, and the average particle size was stabilized at an acceptable level of about 0.055–0.065 inches with 7 to 10% agglomeration level. The reactor operated smoothly under the above conditions using the unsupported liquid catalyst.

What is claimed is:

1. A process for controlling the particle growth of a polymer in a gas phase, fluidized bed, polymerization reaction which comprises:

(a) continuously introducing a gaseous stream comprising one or more monomers having from 2 to 18 carbon atoms in a reactor;

(b) introducing an inert particulate material into the reactor so as to maintain an amount in the polymer ranging from about 0.1 to 75 wt % and so as to maintain an average particle size in the polymer in the range of 0.01 to 0.08 inches substantially free of oversized polymer particles;

(c) introducing an unsupported polymerization catalyst in liquid form comprising:

(A) (i) a transition metal compound selected from Groups IIIB to VIII of the Periodic Table of Elements and optionally (ii) an organometallic compound, wherein (i) and (ii) are in liquid form; or (B) a solution of (i) a transition metal compound selected from Groups IIIB to VIII of the Periodic Table of Elements or (ii) the reaction product of a transition metal compound selected from Groups IIIB to VIII of the Periodic Table of Elements and an organometallic compound; and (c) withdrawing a polymeric product from said reaction zone.

2. The process of claim 1 wherein the inert particulate material is introduced continuously at the top of or above the fluidized bed and is selected from the group consisting of carbon black, silica, clay, talc, inert organic polymeric material, and mixtures thereof.

3. The process of claim 2 wherein the gaseous stream contains a diene.

4. The process of claim 1 wherein the transition metal compound is selected from the group consisting of titanium, vanadium, zirconium, hafnium, chromium compounds, or a mixture thereof.

5. The process of claim 4 wherein the transition metal compound is a vanadium compound or a reaction product of a vanadium compound and an electron donor.

6. The process of claim 5 wherein the vanadium compound is a vanadium acetylacetonate or a vanadium chloracetylacetonate.

7. The process of claim 5 wherein the vanadium compound is employed with cocatalyst selected from the group consisting of (i) an alkyl aluminum halide having the formula $AlR_{(3-a)}X_a$ wherein each R is independently an alkyl having 1 to 14 carbon atoms, each X is independently chlorine, bromine or iodine, and a is 1 or 2 and (ii) a trialkylaluminum compound having the formula $AlR_3$ wherein each R is independently an alkyl having 1 to 14 carbon atoms;

and a promoter selected from the group consisting of (a) a chlorinated ester having at least two chlorine atoms or a perchlorinated ester, (b) a saturated aliphatic hydrocarbon having the formula $R_yCX_{(4-y)}$ wherein R is hydrogen or an unsubstituted or halogen-substituted alkyl radical having 1 to 6 carbons, each X is independently fluorine, chlorine, bromine or iodine and y is an integer from 0 to 2, (c) a saturated aliphatic halocarbon having the formula $C_3X_aF_bH_c$ wherein each X is independently chlorine, bromine, or iodine, a is an integer from 6 to 8, b and c are integers from 0 to 2, and a+b+c equals 8, and (d) an unsaturated aliphatic halocarbon or a unsaturated halocarbon having a $CX_3$ group attached to a C=C group wherein each X is independently chlorine, bromine or iodine or a haloalkyl substituted aromatic hydrocarbon wherein the haloalkyl substituent has at least 3 halogen atoms.

8. The process according to claim 3 wherein the polymerization is conducted above the softening temperature of the sticky polymer.

9. The process of claim 1 wherein the polymer produced by the process is a polyolefin homopolymer, copolymer or terpolymer of a $C_2$ to $C_{18}$ alpha olefin.

10. The process of claim 1 wherein the polymer is a sticky polymer selected from the group consisting of ethylene/propylene rubbers, ethylene/propylene/diene termonomer rubbers, high ethylene content propylene/ethylene block copolymers, poly(1-butene), low density (low modulus) polyethylenes.

* * * * *